(12) United States Patent
Suchy et al.

(10) Patent No.: US 11,909,202 B2
(45) Date of Patent: Feb. 20, 2024

(54) OVERCURRENT PROTECTION DEVICE FOR SURGE ARRESTERS

(71) Applicant: Saltek s.r.o., Usti nad Labem (CZ)

(72) Inventors: Jaromir Suchy, Usti nad Labem (CZ); Martin Cadek, Horazdovice (CZ)

(73) Assignee: Saltek s.r.o., Usti nad Labem (CZ)

( * ) Notice: Subject to any disclaimer, the term of this patent is extended or adjusted under 35 U.S.C. 154(b) by 0 days.

(21) Appl. No.: 17/829,262

(22) Filed: May 31, 2022

(65) Prior Publication Data

US 2022/0385060 A1 Dec. 1, 2022

(30) Foreign Application Priority Data

Jun. 1, 2021 (CZ) .................................. CZ2021-268

(51) Int. Cl.
*H02H 9/02* (2006.01)
*H01H 85/20* (2006.01)

(52) U.S. Cl.
CPC ............... *H02H 9/02* (2013.01); *H01H 85/20* (2013.01); *H01H 2085/2085* (2013.01)

(58) Field of Classification Search
CPC ............ H02H 9/02; H02H 9/04; H01H 85/20; H01H 85/44; H01H 85/143; H01H 85/00; H01H 2085/2085
USPC ........................................ 361/103, 93.7–93.9
See application file for complete search history.

(56) References Cited

U.S. PATENT DOCUMENTS

| | | | | |
|---|---|---|---|---|
| 5,583,729 A * | 12/1996 | Hassler | ............... | H01H 85/12 |
| | | | | 361/39 |
| 7,834,738 B2 * | 11/2010 | Muench, Jr. | ......... | H01H 85/143 |
| | | | | 337/248 |
| 2014/0218159 A1 * | 8/2014 | Wosgien | ............... | H01C 7/126 |
| | | | | 337/186 |
| 2015/0171622 A1 | 6/2015 | Lee et al. | | |

FOREIGN PATENT DOCUMENTS

| | | |
|---|---|---|
| CN | 211907368 | 11/2020 |
| CN | 212783330 | 3/2021 |
| CN | 212783332 | 3/2021 |
| WO | 2020233667 | 11/2020 |

OTHER PUBLICATIONS

Search Report—Industrial Property Office of the Czech Repubic, dated Nov. 30, 2021.

* cited by examiner

*Primary Examiner* — Danny Nguyen
(74) *Attorney, Agent, or Firm* — Krishna Kalidindi

(57) ABSTRACT

This device consists of a housing (1) made of electrically insulating material, in which a fuse (6) is provided with at least one main fuse wire (7) located in its cavity. The main fuse wire (7) is electrically conductively connected at one end to at least one connecting pin (2) which is led out of the housing (1) and at the other end it is electrically conductively connected to at least one terminal (3) located in at least one cavity (4) formed in the housing (1). The shape of the connecting pin (2) is adapted for connection to the protected device.

9 Claims, 3 Drawing Sheets

OVERCURRENT PROTECTION DEVICE FOR SURGE ARRESTERS

FIELD OF THE INVENTION

The present solution relates to a modular fuse arrangement which allows easy mounting to protected electrical devices, in particular surge arresters.

BACKGROUND ART

To protect electrical equipment, therefore also surge arresters, various methods of protection against low fault current, overcurrent and short-circuit current are used by means of fuses and circuit breakers, or the overcurrent protection is located directly in the surge arrester.

Cylindrical fuses are known, which usually comprise a main fuse element and sealing caps made of electrically conductive material. These sealing caps also form a contact for connection to the fuse holder. By means of fuse holders, the fuse is connected to the protected electrical equipment and to the distribution network.

Other types of fuses usually include a main fuse element, an insulating sleeve with closing plates made of electrically conductive material and knife blade contacts, and a matched fuse holder. Screws with washers and nuts are used to connect to the distribution network and the protected equipment.

Such solutions are described in many non-patent publicly available documents such as of Legrand, Schneider Electric, ABB and other manufacturers.

The solution described in document EP1246212A2 is known from the patent literature, enabling the connection of fuses to busbars. The contact system has a make-contact associated with the change-over contact for disconnecting the fuse and a contact associated with the busbar.

Another document DE102015204974B3 discloses a multi-pole switch which is formed of several pole bushings for electrical fuse contacts with the possibility of connecting a cable to the fuse contacts.

Document CZ299300 discloses a technical solution of an electric fuse link with a dual indication of the operational status performed simultaneously on the fuse cover and at the same time on the front of its body. The fuse comprises at least one main fuse wire, which is monitored by a signal fuse wire connected in parallel to it, one end of which is firmly connected to one contact part of the fuse link, and the other end of which passes through the second cover, is tensioned by a spring element. with the second contact part of the fuse link. Furthermore, the fuse comprises a slide passing through an opening in the second cap of the fuse link body, which slide is slidably arranged under the screening shield along the outer surface of the front side of the fuse link body. The visible free end of the slide relative to the adjacent edge of the screening shield forms a plug-in indicator for the first indication area. At the opposite end, above the opening in the second cap of the fuse link body, the slide is provided with an angled arm which engages with a spring element controlled by a signal fuse wire. The fuse link is equipped on both sides with knife blade contacts for mounting in a fuse holder, through which they are connected to the protected equipment and to the LV distribution network by means of wires.

WO9940599A1 describes another solution for a low voltage electrical fuse link. The fuse link comprises a fuse housing which is filled with extinguishing medium, cover plates laterally attached to the fuse housing, a main fuse wire electrically connected to the contact pins which protrude through said cover plates, a signal wire and an indicator which is activated by a spring. The indicator is longitudinally axially extended into the opening provided in the fuse housing, the opening in the fuse housing allows a visual inspection of the operating condition of the fuse link. The contact pins are adapted for installation in the fuse holder, through which they are connected to the protected equipment and to the LV distribution network by means of wires.

DE102008013447 describes a solution for a surge arrester with a varistor protection element, to which a fuse is connected in parallel via a commutation device. In the event of a fault condition of the arrester, the switching path is switched by the commutation device to a fuse, which ensures the interruption of the short-circuit current. The disadvantage of the solution is the small space, which limits the size of the fuse and thus the maximum possible parameters.

Another document, DE102010047244A1, discloses a technical solution of an overvoltage protection device which has a protection element connected to a sensor which generates an electrical trip signal and the switching device disconnects the surge arrester from the circuit.

A similar technical solution is described in WO2012045610A1, wherein the overvoltage device comprises an arrester on which a sensor generating an electrical trip signal is located. The switching device receives a trip signal and separates the surge arrester from the electrical circuit, said switching device and the arrester being arranged as physically separately.

Another document, US2016204599A1, addresses the overload protection arrangement of overvoltage protection devices which comprise at least one voltage limiting element and at least one voltage switching element as well as an alternative series fuse, the voltage limiting element is designed as a varistor and a voltage switching element as a spark gap and these elements being connected in series.

A surge protection solution, according to US2011013330A1, is also known, comprising at least one surge protection component, a heat-sensitive member capable of deformation according to its temperature; a thermal connection between at least one protective member and the heat-sensitive member and at least one mechanical member of the electrical disconnecting device. As soon as the heat-sensitive member exceeds a given temperature limit, it then triggers the electrical disconnecting device.

The invention according to US2017236674A1 relates to a technical solution of a fuse which is connected in series with a protected device, the serial connection being simultaneously connected to the supply network. The fuse has a first and a second contact connected by a fuse wire, the first contact being used to connect to one grid potential, the second contact being used to make electrical contact with the device to be protected, which is connected to the second grid potential. The fuse also has another contact which is isolated from both the first contact and the second contact and is in the normal state without contact with the fuse wire, and the fourth contact connected by the auxiliary fuse wire to the first contact, which provides external triggering. The protected device also contains surge protection. The disadvantage of this is the considerable complexity and thus the difficulty of series production.

The described technical solutions are generally complicated and therefore expensive. As a rule, they require additional devices such as fuse holders for the installation of the distribution network connection, or they do not allow full use of surge arrester parameters due to low resistance of fuses or circuit breakers against impulse currents.

SUMMARY OF THE INVENTION

The above-mentioned drawbacks are eliminated by the overcurrent protection device, in particular for the protection of surge arresters according to the present invention. This device consists of a housing made of electrically insulating material, in which a fuse is provided with at least one main fuse wire located in its cavity. The essence of the new solution is that the main fuse wire is electrically conductively connected at one end to at least one connecting pin which is led out of the housing and at the other end is electrically conductively connected to at least one terminal located in at least one cavity formed in the housing. The shape of the connecting pin is adapted for connection to the protected device.

It is advantageous if at least one signal fuse wire is connected in parallel to the main fuse wire. In this case, the overcurrent protection device can be supplemented with an indication of the operational status. For this purpose, an inspection opening is formed on the housing, under which a slider with a marked indication area is slidably arranged along the inner surface of the housing. Another component is a lever made of electrically conductive material, which is electrically conductively anchored at one end on the terminal lead in a direction perpendicular to the longitudinal axis of the fuse and is at the same time electrically conductively connected to the signal fuse wire. The other end of the lever, depending on the condition of the signal fuse wire, forms a stop for the slider, which is in contact with the spring element.

One possible solution is that the spring element is formed by a compression spring, one end of which rests on the housing and the other on the slider. Another possibility is that the spring element is formed directly by a lever, which is made of a resiliently hard electrically conductive material.

Another improvement of the device is that a switch electrically connected to the connector for connection to the control system can be placed in the housing. It is advantageous if the switch is located near the upper end of the lever or if it is located near the slider.

Thus, a new overcurrent protection device is realized, which combines the fuse holder and the fuse into one unit and allows the overcurrent protection device to be connected on one side directly to the protected electrical device and on the other side via a terminal using wires to the distribution network. This simplifies and reduces the cost of installation and reduces investment costs.

In preferred embodiments, the solution allows the signalling of the operational status, both locally using an indication area and remotely via a switch and a connector.

BRIEF DESCRIPTION OF THE DRAWINGS

An example of an overcurrent protection device, particularly for the protection of surge arresters according to the present solution, is shown in the accompanying drawings.

Figure 3:
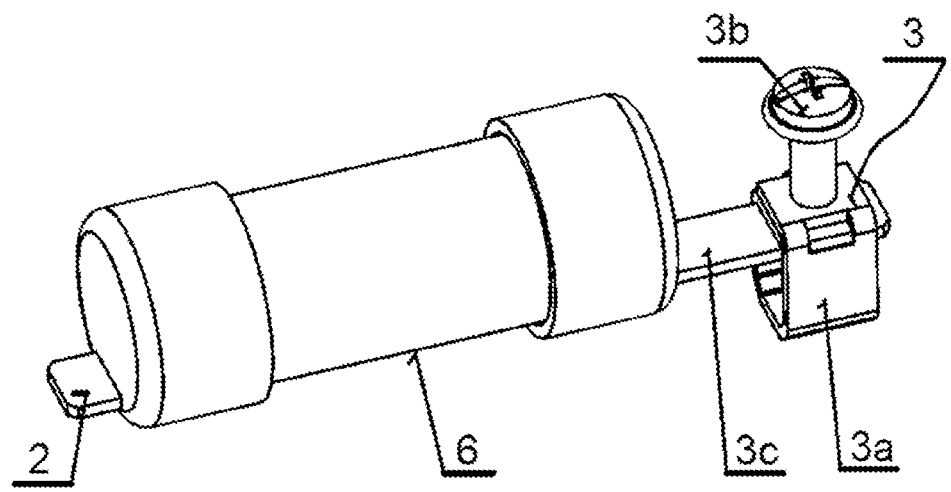

One possible embodiment of the terminal is shown in FIG. 3.

Figure 4:
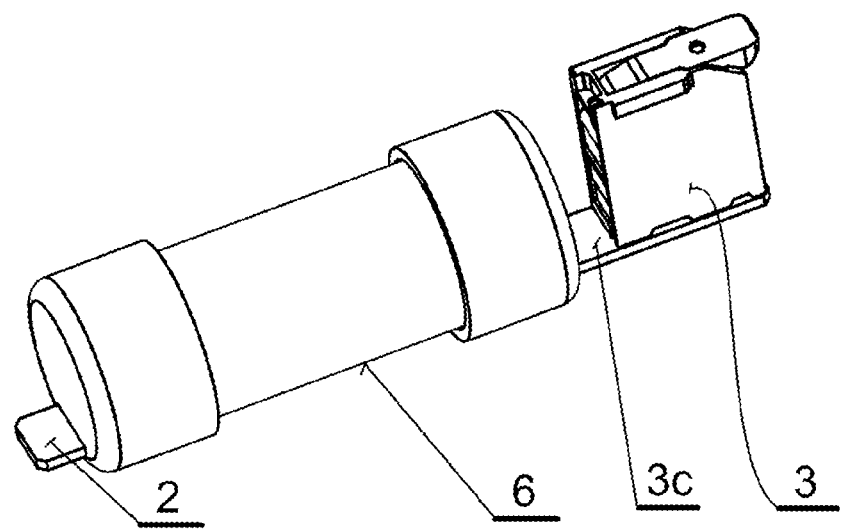

Another embodiment of the terminal in the so-called screwless version is shown in FIG. 4.

Figure 5:
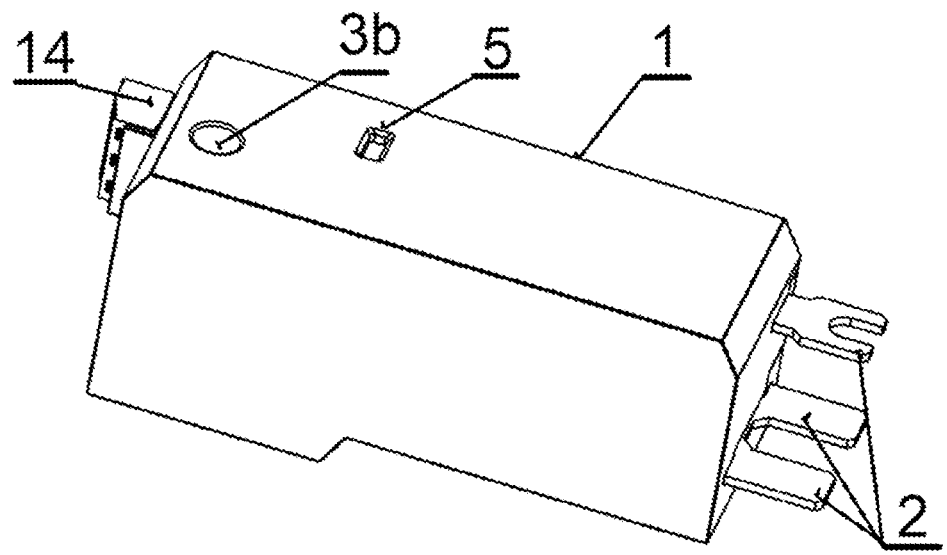
Figure 6:
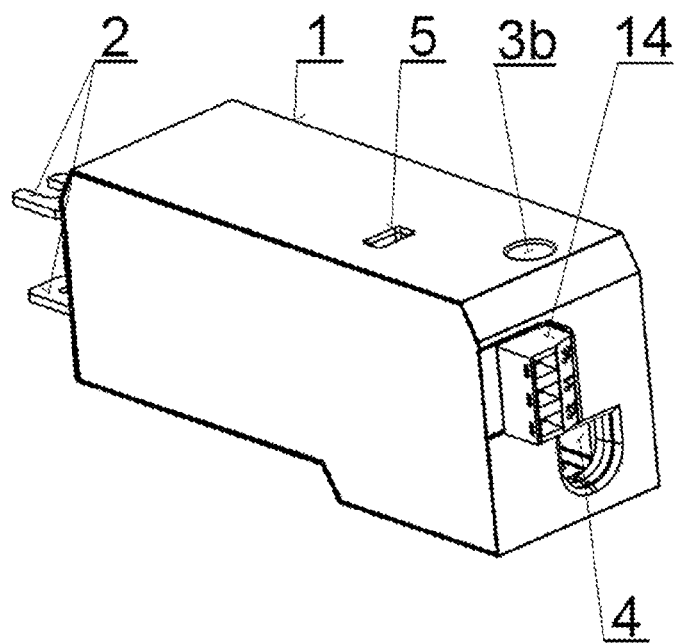

FIG. 5 is a view of the device housing from the pin side, and FIG. 6 is a side view of the terminal.

EXAMPLES OF THE INVENTION EMBODIMENTS

Figure 1:
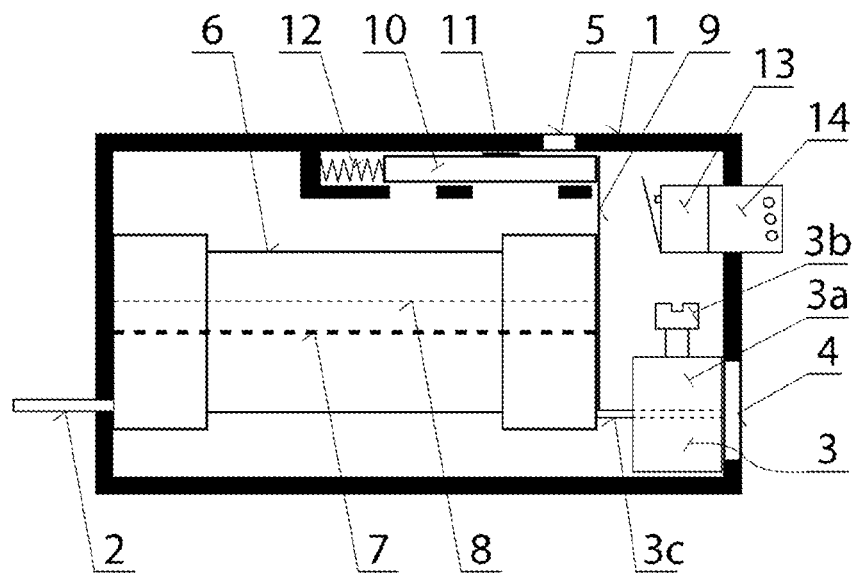
FIG. 1 schematically shows the device at rest.

An example of an overcurrent protection device in a modular design, particularly for the protection of surge arresters, is shown schematically in longitudinal section in FIG. 1. The device consists of a fuse 6, in this example with one main fuse wire 7 and one signal fuse wire 8 placed in parallel with it. The main fuse wire 7 is electrically conductively connected at one end to an electrically conductive pin 2 which is led out of the housing 1 and at the other end it is electrically conductively connected in this example to one terminal 3 located in the cavity 4 provided in the housing 1. The shape of the connecting pin 2 is adapted for connection to the protected device. In the exemplary embodiment, a signal fuse wire 8 is arranged in parallel with the main fuse wire 7, which is also electrically conductively connected to the pin 2 at one end, while its other end is electrically conductively connected to the terminal 3 via a lever 9. The lever 9 made of electrically conductive material is rotatably anchored at one end in a direction perpendicular to the longitudinal axis of the fuse 6 to the lead 3c of the terminal 3. The other end of the lever 9, depending on the condition of the signal fuse wire 8, forms a stop for the slider 10, which is in contact with a spring element realized, for example, by a compression spring 12. The spring element can also be formed in another way, for example directly by a lever 9 made of a resiliently hard electrically conductive material. The slider 10, usually made of electrically insulating material, has an indication area 11 formed at a suitable location, for example by a different surface colour.

Figure 2:
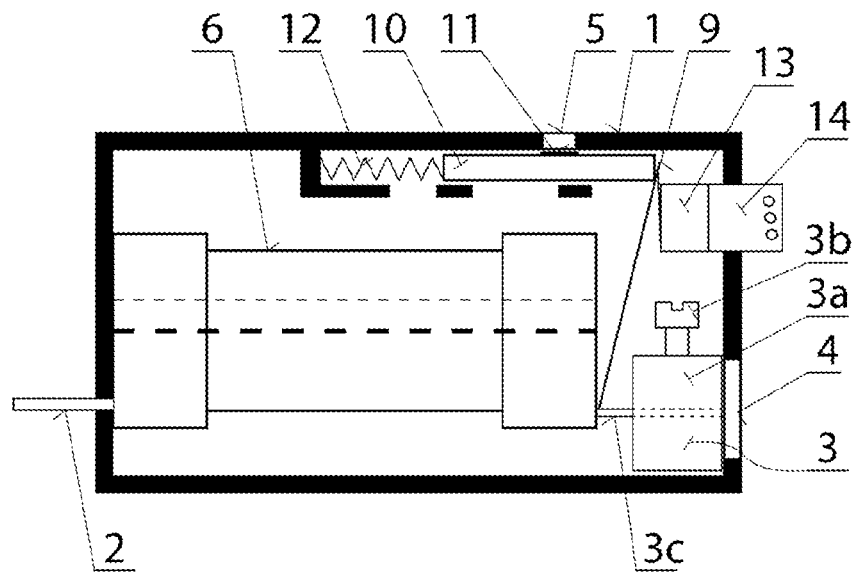
FIG. 2 shows a view of the device in the state after the interruption of the main and signal wires, when the indication area is visible in the inspection opening and the switch is closed.

An inspection opening 5 is provided in the housing 1, in which the slider 10 is visible, both in the position signalling the functional operational status of the device and in the position signalling the non-functional operational status of the device, as shown in FIG. 2. FIG. 2 shows a situation where, after the main fuse wire 7 is interrupted, the signal fuse 8 is interrupted, releasing the lever 9 from its position and moving the slider 10 under the force of the spring element, and an indication area 11 appears in the inspection opening 5, indicating non-functional status of the device.

FIG. 3 shows a preferred embodiment with a terminal 3 consisting of a clamp 3a of the terminal, a screw 3b and a lead 3c.

Another advantageous embodiment with terminal 3 in the so-called screwless version is demonstrated in FIG. 4.

A view of the device with pins 2 formed by three flat strips, one of which is fork-shaped, is shown in FIG. 5 and FIG. 6, this advantageous embodiment allows easy connection to a protected surge arrester.

It is also conceivable that the pins 2 will be shaped for connection to various protected devices.

For remote monitoring of the operational status of the device, a switch 13 connected to the connector 14 is located in the housing 1, thus enabling connection to the control system. At the same time, the slider 10 causes the status of the contacts of the switch 13 to change after the position has been changed, thus enabling continuous monitoring and signalling of the non-functional status of the fuse. In a preferred embodiment, the signalling lever 9 acts directly on the switch 13.

INDUSTRIAL APPLICABILITY

The above-mentioned overcurrent protection device in modular design can be used in industrial and domestic installations to protect electrical equipment, especially surge arresters, against low fault current, overcurrent and short-circuit current with significant savings in investment costs.

REFERENCE SIGNS LIST

1. Housing
2. Connecting pin
3. Terminal: 3a—Clamp of the terminal; 3b—Screw; 3c Lead
4. Cavity
5. Inspection opening
6. Fuse
7. Main fuse wire
8. Signal fuse wire
9. Lever
10. Slider
11. Indication area
12. Spring
13. Switch
14. Connector

The invention claimed is:

1. An overcurrent protection device, comprising:
a housing made of electrically insulating material;
a fuse provided within the housing, the fuse having at least one main fuse wire located in a cavity of the fuse;
at least one signal fuse wire connected in parallel to the main fuse wire, wherein
a first end of the main fuse wire is electrically conductively connected to at least one connecting pin, the connecting pin being led out of the housing and shaped for connection to a protected device; and
a second end of the main fuse wire is electrically conductively connected to at least one terminal located in at least a second cavity formed in the housing;
an inspection opening provided on the housing;
a slider disposed under the opening, the slider having a marked display area and being slidably arranged along an inner surface of the housing; and
a lever made of electrically conductive material placed in the housing wherein
a first end of the lever is electrically conductively anchored to a lead of the terminal, rotatably in a direction perpendicular to the longitudinal axis of the fuse and simultaneously electrically conductively connected to the signal fuse wire; and
a second end of the lever forms a stop for the slider.

2. The device of claim 1, wherein the second cavity is outside the cavity of the fuse.

3. The device of claim 1, wherein the protected device is a surge arrester.

4. The device of claim 1, further comprising:
a spring element in contact with the slider at an end of the slider that is distal from the lever.

5. The device of claim 4, wherein the spring element is formed by a compression spring, one end of which rests on the housing and the other on the slider.

6. The device of claim 5, wherein the spring element is formed by a lever made of a resiliently hard electrically conductive material.

7. The device of claim 1, further comprising:
a switch;
a control system; and
a connector electrically connected to the switch for providing connection to the control system.

8. The device of claim 7, wherein the switch is proximal to the one end of the lever.

9. The device of claim 7, wherein the switch is proximal to the slider.

* * * * *